(12) United States Patent
Shioya et al.

(10) Patent No.: US 9,914,174 B2
(45) Date of Patent: Mar. 13, 2018

(54) LATHE

(71) Applicant: FUJI MACHINE MFG. CO., LTD., Chiryu (JP)

(72) Inventors: Yasumoto Shioya, Chiryu (JP); Shigeyuki Ino, Chiryu (JP); Shigefumi Suzuyama, Chiryu (JP); Masaki Kojima, Chiryu (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 0 days.

(21) Appl. No.: 14/889,966

(22) PCT Filed: May 10, 2013

(86) PCT No.: PCT/JP2013/063170
§ 371 (c)(1),
(2) Date: Nov. 9, 2015

(87) PCT Pub. No.: WO2014/181465
PCT Pub. Date: Nov. 13, 2014

(65) Prior Publication Data
US 2016/0121405 A1    May 5, 2016

(51) Int. Cl.
*B23B 3/06* (2006.01)
*B23B 3/30* (2006.01)

(52) U.S. Cl.
CPC . *B23B 3/06* (2013.01); *B23B 3/30* (2013.01)

(58) Field of Classification Search
CPC ............ Y10T 82/2552; Y10T 82/2561; Y10T 82/2508; Y10T 82/2566; B23B 3/06;

(Continued)

(56) References Cited

U.S. PATENT DOCUMENTS 4,545,271 A * 10/1985 Romi .................. B23B 3/06
29/36
5,175,914 A * 1/1993 Mitsukuchi ............... B23B 3/06
29/27 C (Continued)

FOREIGN PATENT DOCUMENTS

DE          2944176 A1 *  5/1981  ............... B23B 3/06
DE   102005061587 A1 *  7/2006  ............... B23B 3/06

(Continued)

OTHER PUBLICATIONS

International Search Report dated Jun. 4, 2013 in PCT/JP13/063170 filed May 10, 2013.

*Primary Examiner* — Will Fridie, Jr.
(74) *Attorney, Agent, or Firm* — Oblon, McClelland, Maier & Neustadt, L.L.P.

(57) ABSTRACT

A lathe (1) with a simple construction that is capable of making the relative displacement of a headstock (2) and tool rest (3) due to thermal deformation smaller.

The lathe (1) comprises: a head including a headstock attaching section (51), and a slide attaching section (52) which has a portion with a height lower than the headstock attaching section; a headstock (2) attached to the headstock attaching section (51); a slide section (6) attached to the slide attaching section (52); and a tool rest (2) provided laterally to the headstock (3) and attached to the slide section (6).
The headstock (2) is attached to the headstock attaching section (51) slanted to the tool rest side with respect to the direction in which the headstock (2) and the tool rest (3) are lined up.

9 Claims, 6 Drawing Sheets

(58) Field of Classification Search
CPC ........... B23B 3/16; B23B 3/161; B23B 3/164;
B23B 3/167; B23B 3/30
See application file for complete search history.

(56) References Cited

U.S. PATENT DOCUMENTS

| | | | | |
|---|---|---|---|---|
| 5,343,604 | A * | 9/1994 | Takagi | B23B 3/30 29/27 C |
| 5,429,020 | A * | 7/1995 | Hack | B23Q 1/017 82/117 |
| 8,640,577 | B2 * | 2/2014 | Yamamoto | B23Q 1/5406 409/231 |
| 2008/0066591 | A1 * | 3/2008 | Yamane | B23Q 1/0009 82/121 |
| 2008/0271304 | A1 * | 11/2008 | Grossmann | B23Q 7/04 29/561 |

FOREIGN PATENT DOCUMENTS

| | | | | |
|---|---|---|---|---|
| EP | 1495834 A2 * | 1/2005 | ............ | B23B 3/162 |
| JP | 4 53643 | 2/1992 | | |
| JP | 4 122501 | 4/1992 | | |
| JP | 5 39801 U | 5/1993 | | |
| JP | 7 20201 | 4/1995 | | |
| JP | 8 290305 | 11/1996 | | |
| JP | 5059252 | 10/2012 | | |

* cited by examiner

LATHE

TECHNICAL FIELD

The present invention relates to a lathe for performing specific machining on work.

BACKGROUND ART

A lathe has heat sources such as a spindle motor and spindle. This means thermal deformation occurs to a lathe during work machining. Comparing the headstock and the tool rest, the direction of the thermal deformation is very different. Therefore, when thermal deformation of a lathe occurs, the relative displacement between the headstock and tool rest is large. In other words, the positional deviation between the work attached to the headstock and the blade tip of the tool attached to the tool rest is large. It follows that the machining accuracy of the work deteriorates.

For this point, a slanted type lathe which restricts the direction of thermal deformation of a bed is disclosed in patent literature 1. The slanted type lathe disclosed in the above patent literature is provided with a joint. The joint restricts thermal deformation of the bed in a left-right direction. Also, the joint allows thermal deformation of the bed in a lengthwise direction. The headstock and the tool rest are arranged in a line in a lengthwise direction. Therefore, compared to a case in which a joint is not provided, the relative displacement of the headstock and tool rest due to thermal deformation can be made smaller.

CITATION LIST

Patent Literature

Patent Literature 1: Japanese Unexamined Utility Model Application Publication No. 1995-20201

SUMMARY OF INVENTION

Technical Problem

However, with the slanted type lathe of the patent literature, it is necessary to separate the upper surface section and rear surface section of the bed. Also, it is necessary to arrange a joint engaging section on the top section of the upper surface section. Also, it is necessary to arrange a joint rail section on the front surface of the rear surface section. Therefore, the construction is complex. Thus, an object of the present invention is to provide a lathe with a simple construction that is capable of making the relative displacement of a headstock and tool rest due to thermal deformation smaller.

Solution to Problem (1) To solve the above problems, the present invention is a lathe comprising: a bed that has a headstock attaching section, and a slide attaching section which has a portion with a height lower than the headstock attaching section; a headstock attached to the headstock attaching section; a slide section attached to the slide attaching section; and a tool rest provided laterally to the headstock and attached to the slide section; wherein the headstock is attached to the headstock attaching section slanted to the tool rest side with respect to the direction in which the headstock and the tool rest are lined up.

According to the present invention of a lathe, a headstock is attached slanted to the tool rest side with respect to the direction in which the headstock and tool rest are lined up (the direction in which the blade tip of the tool contacts the work during work machining). Therefore, the relative displacement of the headstock and tool rest due to thermal deformation can be made smaller.

Also, according to the present invention of a lathe, it is not necessary to arrange a joint on the bed. In other words, it is not necessary to arrange a mechanism for achieving anisotropy in the direction of the thermal deformation on the bed. Therefore, the construction is simple.

(2) It is preferable for the configuration from (1) above for the headstock to have a spindle, for the tool rest to have a turret, and for the rotation center line of the spindle and the rotation center line of the turret to be arranged parallel to each other. According to this configuration, the width (the dimension in the direction in which the headstock and tool rest are lined up) of the lathe can be made small.

(3) It is preferable for the configuration from (2) above for the rotation center line of the spindle and the rotation center line of the turret to be arranged at the same height. According to this configuration, the turret can be slid in a horizontal direction while maintaining a parallel state between the respective rotation center lines.

Advantageous Effects of Invention

According to the present invention, it is possible to provide a lathe with a simple construction that is capable of making the relative displacement of a headstock and tool rest due to thermal deformation smaller.

REFERENCE SIGNS LIST

1: lathe
2: headstock; 20: spindle; 21: flange
3: tool rest; 30: tool rest main body; 31: turret
4: spindle motor
5: bed; 50: bed main body; 50L: bed divided body; 50R: bed divided body; 500: widthwise extending section; 501: lengthwise extending section; 501a: inner surface; 501b: outer surface; 502: reduced thickness section; 51: headstock attaching section; 510: attaching surface; 52: slide attaching section; 53: motor attaching section; 54: linking member
6: slide section; 60: first lower slide; 61: shared slide; 610: first slide; 611: second lower slide;

62: second slide
7: bracket
α: angle; θ: angle; φ: angle; A1: rotation center line; A2: rotation center line; L1: relative displacement; L2: relative displacement

DESCRIPTION OF EMBODIMENT

Described below is an embodiment of a lathe of the present invention.

Lathe Configuration

Figure 1:
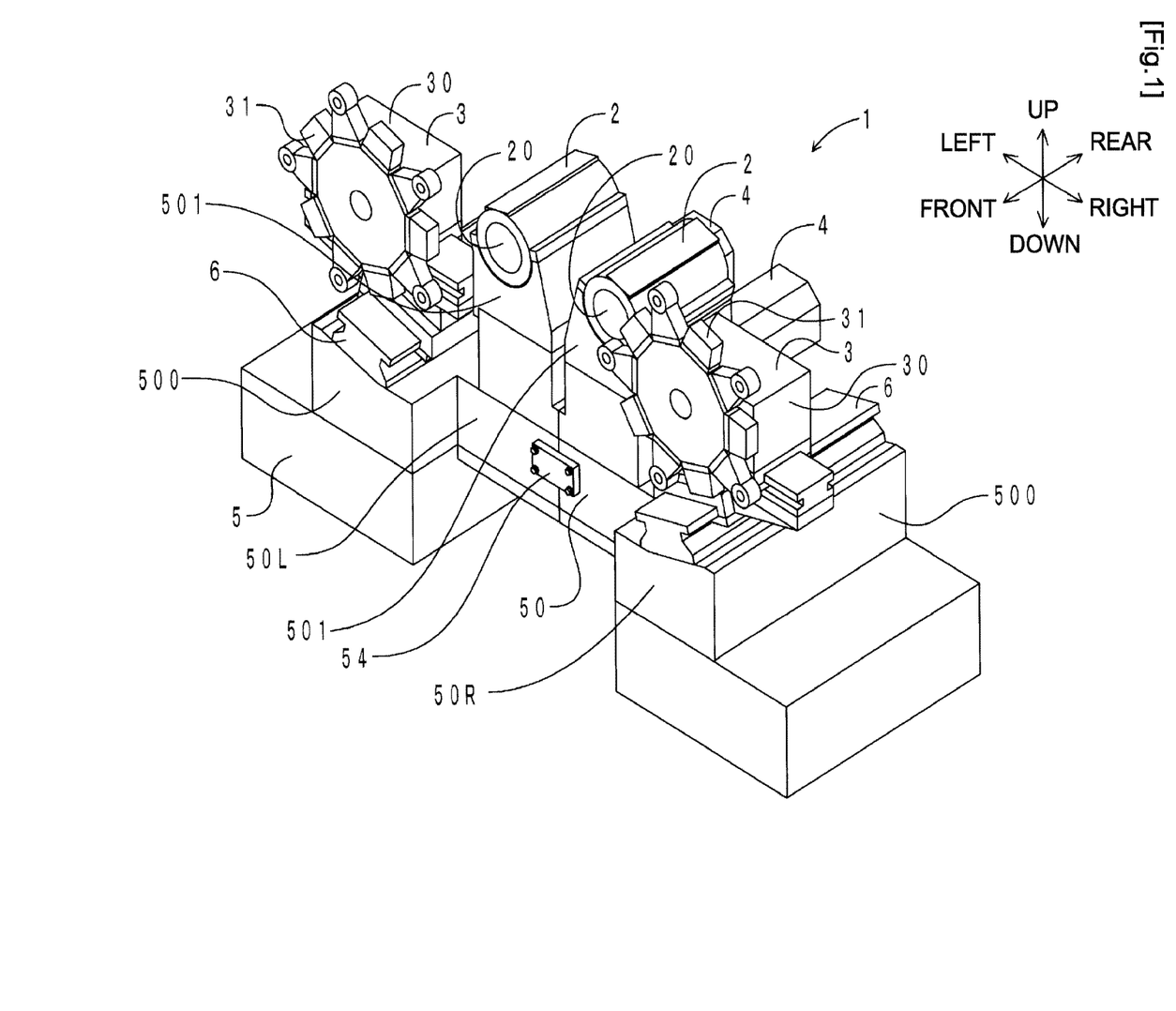
FIG. 1 is a perspective view showing a lathe that is an embodiment of the present invention.
Figure 2:
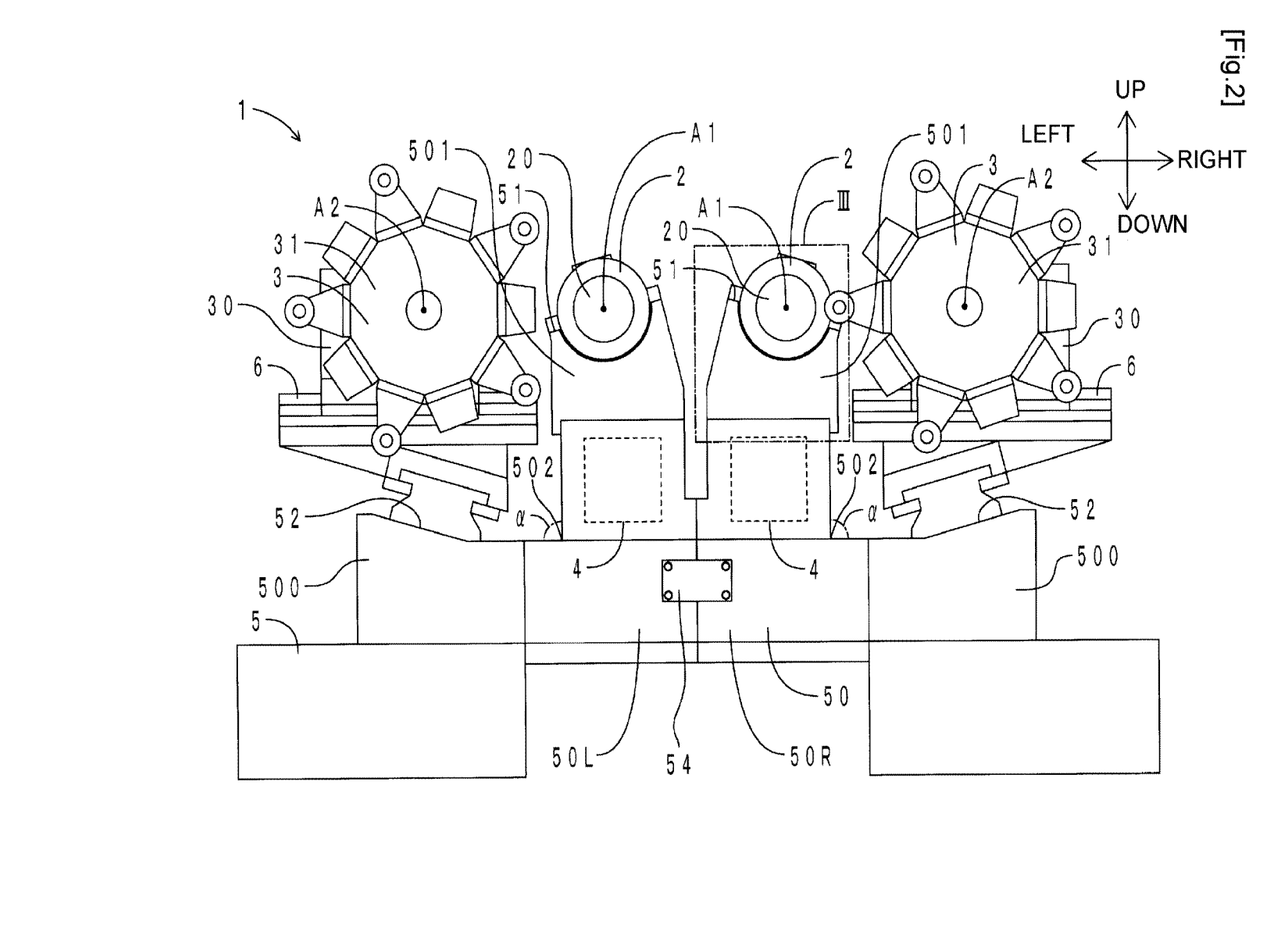
FIG. 2 is a front view of the same lathe.
Figure 3:
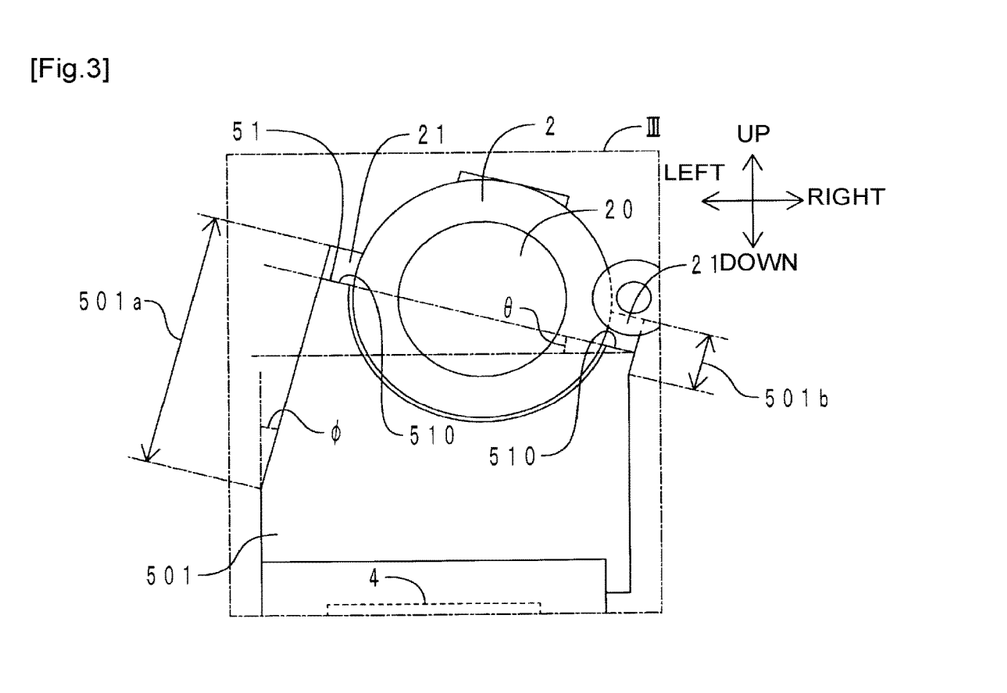
FIG. 3 is an enlarged view of the frame III of FIG. 2.
Figure 4:
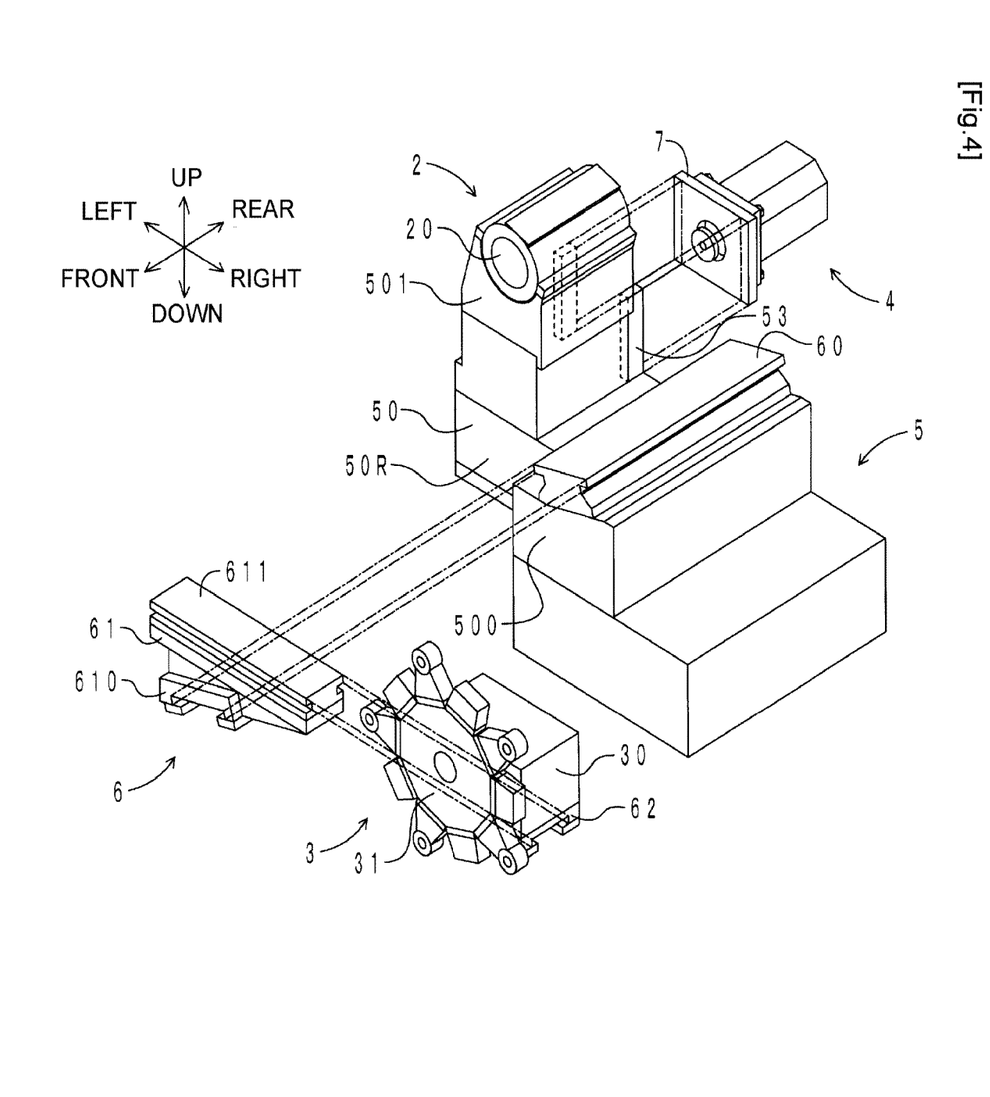
FIG. 4 is an exploded perspective view of the right section of the same lathe.

First, the configuration of the lathe of this embodiment is described. FIG. 1 shows a perspective view of the lathe of this embodiment. FIG. 2 shows a front view of the same lathe. FIG. 3 shows an enlarged view of frame III of FIG. 2. FIG. 4 shows an exploded perspective view of the right section of the same lathe.

As shown in FIGS. 1 to 4, lathe 1 is provided with a left-right pair of headstocks 2, a left-right pair of tool rests 3, a left-right pair of spindle motors 4, bed 5, a left-right pair of slide sections 6, and a left-right pair of brackets 7. Lathe 1 takes a symmetrical form in which two lathes are joined across the boundary of a joint of a left-right pair of widthwise extending sections 500 which are described below.

(Bed 5)

As shown in FIG. 1 and FIG. 2, bed 5 is a cast iron structure. Bed 5 is provided with bed main body 50, a left-right pair of headstock attaching sections 51, a left-right pair of slide attaching sections 52, a left-right pair of motor attaching sections 53, and a front-rear pair of linking members 54.

Bed main body 50 is provided with a left-right pair of bed divided bodies 50L and 50R. In other words, bed main body 50 is divided into left and right sections. Bed divided bodies 50L and 50R are respectively provided with a widthwise extending section 500 and a lengthwise extending section 501.

The left-right pair of widthwise extending sections 500 respectively extend in a left-right direction (horizontal direction). The left-right pair of widthwise extending sections 500 contact in the left-right direction. The front-rear pair of linking members 54 are attached to the both the front and rear sides of the boundary section (joint section) of the left-right pair of widthwise extending sections 500. The front-rear pair of linking members 54 link the left-right pair of widthwise extending sections 500.

The left-right pair of lengthwise extending sections 501 respectively extend up from the widthwise extending section 500. As shown in FIG. 3, the right side lengthwise extending section 501 is provided with an inner surface 501a and an outer surface 501b. Inner surface 501a and outer surface 501b are each flat. Inner surface 501a and outer surface 501b are inclined to the right side (left-right direction outside) by angle φ (for example, 15 degrees) with respect to a vertical direction. The slant direction (angle φ direction) length of inner surface 501a is longer than that of outer surface 501b. The left side of lengthwise extending section 501 and the right side of lengthwise extending section 501 have the same configuration. The left side of lengthwise extending section 501 and the right side of lengthwise extending section 501 are arranged to be symmetrical.

As shown in FIG. 2, a reduced thickness section 502 of angle α (for example, 90 degrees) is set between widthwise extending section 500 and lengthwise extending section 501. Angle α is set such that 0 degrees<α<180 degrees.

Left-right pair of headstock attaching sections 51 are respectively arranged on the upper surface of lengthwise extending section 501. As shown in FIG. 3, the right side headstock attaching section 51 is provided with left-right pair of attaching surfaces 510. Left-right pair of attaching surfaces 510 are each flat. The left side (inside in the left-right direction) attaching surface 510 is arranged above the right side (outside in the left-right direction) attaching surface 510. Attaching surface 510 is slanted to the right side (outside in the left-right direction) by angle θ (for example, 15 degrees) with respect to a left-right direction. In other words, as shown in FIG. 2, slanted to the right side of tool rest 3 by angle θ with respect to the direction in which headstock 2 and tool rest 3 are lined up (the direction in which the blade tip of the tool contacts the work during work machining). The left side headstock attaching section 51 and the right side headstock attaching section 51 have the same configuration. The left side headstock attaching section 51 and the right side headstock attaching section 51 are arranged to be symmetrical.

As shown in FIG. 1 and FIG. 2, left-right pair of slide attaching sections 52 are arranged on the upper surface outside in the left-right direction of widthwise extending section 500. Left-right pair of slide attaching sections 52 are arranged outside in the left-right direction of left-right pair of headstock attaching sections 51. Also, for tool rest 3 to be attached to the upper surface of slide section 6 described later, left-right pair of slide attaching sections 52 are arranged below left-right pair of headstock attaching sections 51. Right side slide attaching section 52 is slanted to the left side (inside in the left-right direction) with respect to the left-right direction. In other words, the right side slide attaching section 52 is slanted to the side of headstock 2 on the right side with respect to the direction in which headstock 2 and tool rest 3 are lined up so that work chips do not get on the upper surface of the first lower slide 60 described later. The left side slide attaching section 52 has the same configuration as the right side slide attaching section 52. The left side slide attaching section 52 is arranged to be symmetrical with the right side slide attaching section 52.

As shown in FIG. 4, the left-right pair of motor attaching sections 53 are respectively arranged on the rear side of lengthwise extending sections 50. Motor attaching section 53 is provided with a left-right pair of attaching ribs.

(Headstock 2)

As shown in FIG. 1 and FIG. 2, left-right pair of headstocks 2 are respectively arranged above headstock attaching section 51. As shown in FIG. 3, the right side headstock 2 is provided with spindle 20 and a left-right pair of flanges 21. Spindle 20 extends in a front-rear direction. Left-right pair of flanges 21 are each thin and flat. The left side (inside in the left-right direction) flange 21 is arranged above the right side (outside in the left-right direction) flange 21. Flanges 21 are slanted to the right side (the outside in the left-right direction) by angle θ with respect to the left-right direction. In other words, as shown in FIG. 2, slanted to the right side of tool rest 3 by angle θ with respect to the direction in which headstock 2 and tool rest 3 are lined up (the direction in which the blade tip of the tool contacts the work during work machining). The left side flange 21 is attached to the left side attaching surface 510. The right side flange 21 is attached to the right side attaching surface 510. The left side headstock 2 has the same configuration as the right side headstock 2. The left side headstock 2 is arranged to be symmetrical with the right side headstock 2.

(Slide Section 6, Tool Rest 3)

As shown in FIG. 1, FIG. 2 and FIG. 4 the left-right pair of slide sections 6 are respectively arranged above slide attaching sections 52. Slide section 6 is provided with first lower slide 60, shared slide 61, and second slide 62. First lower slide 60 is arranged on slide attaching section 52. First lower slide 60 extends in a front-rear direction. Shared slide 61 is provided with first slide 610 and second lower slide 611. First slide 610 can slide in a front-rear direction along first lower slide 60. Second lower slide 611 is arranged above first slide 610. Second lower slide 611 extends in a left-right direction. Second slide 62 can slide in a left-right direction along second lower slide 611.

The left-right pair of tool rests 3 are respectively arranged above slide sections 6. Tool rests 3 can be moved in front-rear and left-right directions by slide section 6. Tool rest 3 is provided with tool rest main body 30 and turret 31. Tool rest main body 30 is arranged on the upper surface of the second slide 62. Turret 31 is arranged on the front surface of tool rest main body 30. Turret 31 is intermittently rotatable at a specific angle by tool rest main body 30. Multiple tools (not shown) are attached to turret 31.

As shown in FIG. 2, rotation center line A1 of spindle 20 and rotation center line A2 of turret 31 both extend in a front-rear direction. In other words, rotation center line A1 of spindle 20 and rotation center line A2 of turret 31 are parallel to each other. Rotation center line A1 of spindle 20 and rotation center line A2 of turret 31 are lined up in a left-right direction.

(Bracket 7, Spindle Motor 4)

As shown in FIG. 4, left-right pair of brackets 7 are respectively attached to motor attaching sections 53. Left-right pair of spindle motors 4 are respectively attached to brackets 7. The moving power of spindle motor 4 is transmitted to spindle 20 via a belt (not shown).

Lathe Operation

Figure 5:
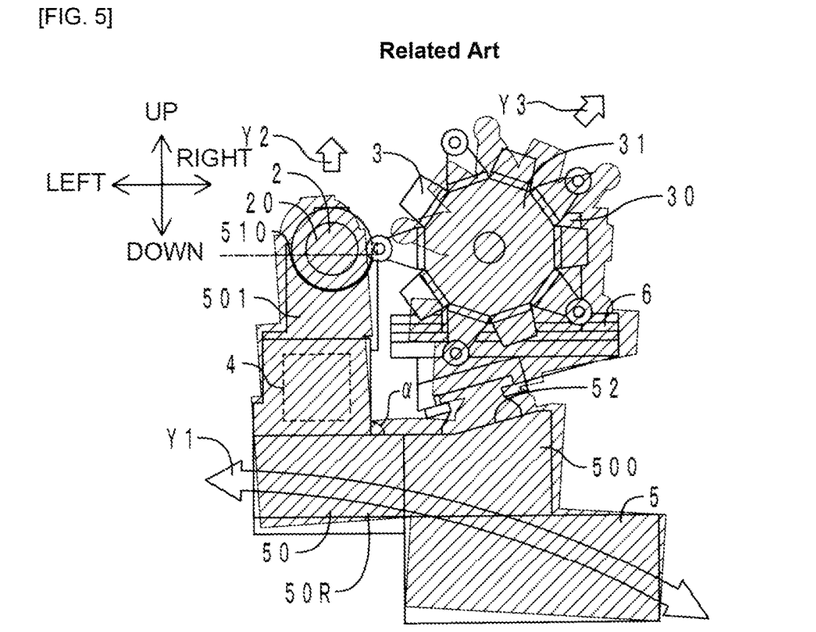
FIG. 5 is a front view of the right section of a conventional lathe.
Figure 6:
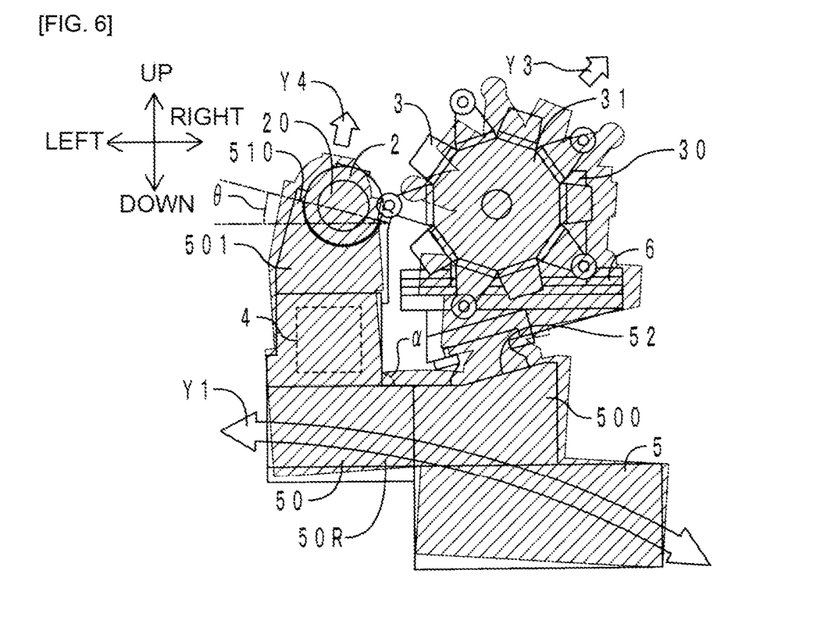
FIG. 6 is a front view of the right section of a lathe that is an embodiment of the present invention.
Figure 7:
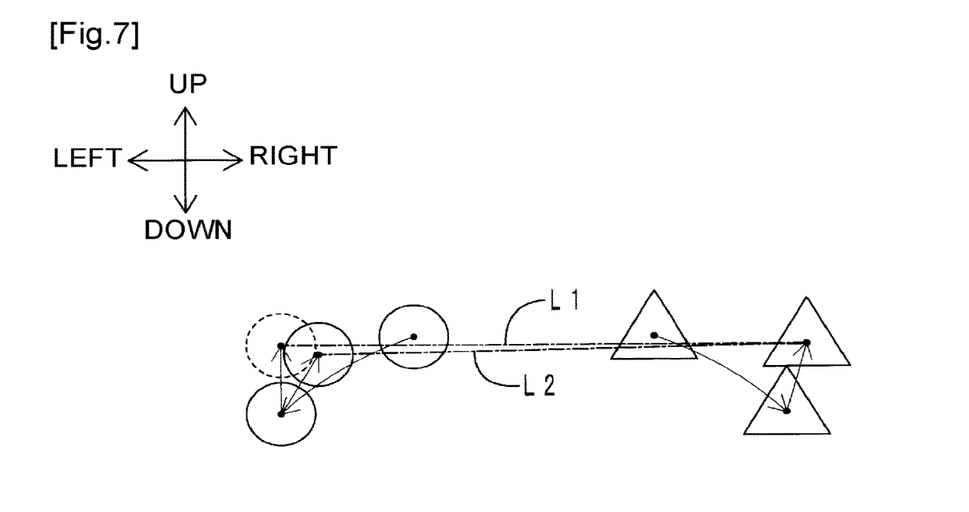
FIG. 7 is a conceptual diagram showing the relative displacement between a spindle and a turret due to thermal deformation.

Next, the operation of the lathe of this embodiment is described. FIG. 5 shows a front view of the right side portion of a conventional lathe. FIG. 6 shows a front view of the right side portion of the lathe of this embodiment. The shape after thermal deformation is shown by hatching. FIG. 7 shows the relative displacement between the spindle and turret due to thermal deformation. The spindle center and turret center are shown by a solid line circle (○) and a solid line triangle (Δ) respectively. The spindle center for a conventional lathe is shown by a dotted line circle (○). Also, in FIGS. 5 to 7, for ease of understanding, the thermal deformation amount is exaggerated.

In a conventional lathe, angles φ and θ shown in FIG. 3 are both zero degrees. In other words, as shown in FIG. 5, left-right pair of attaching surfaces 510 each extend in a horizontal direction. Also, left-right pair of flanges 21 are lined up in a horizontal direction. Therefore, in a conventional lathe, headstock 2 is not slanted to the tool rest 3 side.

During machining of work, the heat from spindle motor 4, spindle 20, slide section 6 and so on is transmitted to bed 5. Here, as shown in FIG. 2, bed 5 is provided with reduced thickness section 502 such that there is a height difference between headstock attaching section 51 and slide attaching section 52. Bed 5 thermally deforms in the direction in which angle α of reduced thickness section 502 opens. In other words, widthwise extending section 500 tries to move right and down (down and outside in the left-right direction). Due to this, slide section 6, tool rest 3, and consequently the blade tip of the tools also try to move right and down. Conversely, lengthwise extending section 501 tries to move left and down (down and inside in the left-right direction). Due to this, headstock 2 also tries to move left and down. However, in actuality lathe 1 is arranged on a factory floor. Due to this, as shown by arrow Y1 in FIG. 5, bed divided body 50R deforms in an arc (the center of curvature of the arc is on the floor side). In this way, due to the thermal deformation (bending deformation) caused by reduced thickness section 502 of bed 5, tool rest 3 and headstock 2 move in a direction away from each other drawing the path of the arc.

Also, in addition to the above bending deformation, bed 5 thermally deforms in an overall way. For example, as shown by arrow Y2 in FIG. 5, lengthwise extending section 501 stretches mainly upwards. Due to this, headstock 2 and lengthwise extending section 501 both move up. Also, as shown by arrow Y3 in FIG. 5, widthwise extending section 500 stretches right and up (up and outside in the left-right direction). Due to this, slide section 6, tool rest 3, and consequently the blade tip of the tools also move right and up along with widthwise extending section 500. In this way, as shown by arrows Y2 and Y3 in FIG. 5, due to the overall thermal deformation (overall deformation) of bed 5, tool rest 3 and headstock 2 move in a direction away from each other and each moves up.

In this way, the relative displacement of headstock 2 and tool rest 3 is roughly the combined displacement of the displacement due to bending deformation shown by arrow Y1 (displacement caused by reduced thickness section 502) and the displacement due to overall deformation shown by Y2 and Y3 (displacement caused by bed 5 overall). Due to this, as shown in FIG. 7, with a conventional lathe, a relative displacement L1 arises between the dotted line circle (○) that is the spindle center and the solid line triangle (Δ) that is the turret center.

In contrast, with the lathe of this embodiment, angle θ shown in FIG. 3 is set such that 0 degrees<θ<90 degrees. Also, angle φ shown in FIG. 3 is set such that 0 degrees<φ<90 degrees. In other words, as shown in FIG. 6, left-right pair of attaching surfaces 510 respectively slant to the right side by angle θ with respect to a horizontal direction. Also, left side flange 21 is arranged above right side flange 21. In this way, in the lathe of this embodiment, headstock 2 is slanted to the tool rest 3 side.

During work machining, the same as a conventional lathe, due to the thermal deformation (bending deformation) caused by reduced thickness section 502 of bed 5, as shown by arrow Y1 in FIG. 6, tool rest 3 and headstock 2 move in a direction away from each other drawing the path of the arc. Also, the same as a conventional lathe, due to the overall thermal deformation (overall deformation) of bed 5, as shown by arrow Y3 in FIG. 6, slide section 6, tool rest 3, and consequently the blade tip of the tools also move right and up along with widthwise extending section 500.

However, as shown in FIG. 3, widthwise extending section 501 stretches in an angle φ direction (right and up) with respect to an up-down direction (vertical direction). In other words, as shown in FIG. 3, the slant direction length for inner surface 501a is longer than that for outer surface 501b. Due to this, the stretch amount for the inner surface 501a side is larger than that for the outer surface 501b side. As shown by arrow Y4 in FIG. 6, lengthwise extending section 501 stretches right and up by the difference of this stretch amount. Therefore, headstock 2 and lengthwise extending section 501 both move right and up. It follows that, as shown in FIG. 7, a relative displacement L2 arises between the solid line circle (○) that is the spindle center and the solid line triangle (Δ) that is the turret center.

As shown in FIG. 7, relative displacement L2 is smaller than relative displacement L1 by the amount set by angles φ and θ shown in FIG. 3. In other words, the relative displacement due to thermal deformation for the lathe of this embodiment is smaller than that for a conventional lathe.

Also, with the lathe of this embodiment, the movement direction of the spindle center (right and up) includes a right component. Due to this, for the left-right direction, the machining point of the work (the position at which the blade tip makes contact) can be moved to the tool blade tip side.

Effects

Next, effects of the lathe of this embodiment are described. According to the lathe of this embodiment, as shown in FIG. 2 and FIG. 3, angles $\phi$ and $\theta$ are set. In other words, headstock 2 is attached to headstock attaching section 51 slanted to the tool rest 3 side with respect to the direction in which headstock 2 and tool rest 3 are lined up (the direction in which the blade tip of the tool contacts the work during work machining). Due to this, as shown in FIGS. 5 to 7, compared to a case in which headstock 2 is attached to headstock attaching section 51 not slanted to the tool rest 3 side, when thermal deformation occurs, headstock 2 moves more easily in a direction towards tool rest 3. In other words, it is easier for headstock 2 to be displaced such that the displacement amount of the above-mentioned slide section 6, tool rest 3, and tool blade tip (the displacement amount in the direction moved away from headstock 2) is canceled out. Accordingly, the relative displacement of headstock 2 and tool rest 3 due to thermal deformation can be made smaller. In particular, the relative displacement between headstock 2 and tool rest 3 can be made smaller in the direction of the diameter of spindle 20 (the direction of the diameter of the work). This means that the thermal displacement amount in the direction of the machining diameter is small for lathe 1.

Also, to correct the relative displacement amount of headstock 2 and tool rest 3 due to thermal deformation, a displacement correction amount must be entered into the machining program when machining work. According to lathe 1 of this embodiment, the frequency of entering a displacement correction amount can be reduced. Also, the displacement correction amount can be made smaller.

For example, in cases in which machining time is long, the relative displacement amount of headstock 2 and tool rest 3 due to thermal deformation is large. Also, the relative displacement amount of headstock 2 and tool rest 3 due to thermal deformation is large before and after breaks (stops in machining). Even for cases such as these, according to lathe 1 of this embodiment, the relative displacement of the headstock and tool rest due to thermal deformation can be made smaller. Due to this, the frequency of entering a displacement correction amount can be reduced. Also, the displacement correction amount can be made smaller. Also, in cases in which the required dimensional accuracy for the work is low (when the dimensional variance in the work is large enough with respect to the thermal displacement amount of the lathe), entering a displacement correction amount is no longer required. Also, according to lathe 1 of this embodiment, it is not necessary to arrange a mechanism for achieving anisotropy in the direction of the thermal deformation on bed 5. Therefore, the construction is simple.

Also, as shown in FIG. 2, rotation center line A1 of spindle 20 and rotation center line A2 of turret 31 are arranged parallel to each other. Due to this, the left-right direction width (the dimension in the direction in which headstock 2 and tool rest 3 are lined up) of lathe 1 can be made smaller.

Also, as shown in FIG. 2, rotation center line A1 of spindle 20 and rotation center line A2 of turret 31 are arranged at the same height. Also, as shown in FIG. 4, second slide 62 can slide in a left-right direction along second lower slide 611. Due to this, turret 31 can be slid in a left-right direction with respect to spindle 20 while maintaining a parallel state between the rotation center lines A1 and A2. Also, as shown in FIG. 1 and FIG. 2, bed main body 50 is divided into left and right sections. Due to this, machining vibrations of the left-right pair of spindles 20 during machining are harder to transmit to each other.

Other Embodiments

An embodiment of a lathe of the present invention was described above. However, embodiments are not limited to the above-described embodiments. People skilled in the art may implement various modified or improved embodiments.

Angle $\alpha$ shown in FIG. 2 merely needs to be such that 0 degrees<$\alpha$<90 degrees. In other words, lengthwise extending section 501 merely needs to extend in a direction intersecting widthwise extending section 500. Angle $\phi$ shown in FIG. 3 merely needs to be such that 0 degrees<$\phi$<90 degrees. Also, angle $\theta$ merely needs to be such that 0 degrees<$\theta$<90 degrees. In other words, headstock 2 merely needs to be slanted to the tool rest 3 side with respect to the direction in which headstock 2 and tool rest 3 are lined up. Also, the lathe of the present invention may be embodied as a horizontal lathe, a frontal lathe, a vertical lathe and so on.

Also, the form of thermal deformation shown in FIGS. 5 to 7 (deformation direction, deformation amount, and so on) is not limited. The form of thermal deformation changes based on the shape, position, quantity and so on of each member (headstock 2, tool rest 3, spindle motor 4, bed 5, slide section 6 and so on).

The invention claimed is:

1. A lathe comprising:
    a bed including a headstock attaching section with an attaching surface, and a slide attaching section which has a portion with a height lower than the headstock attaching section;
    a headstock attached to the attaching surface of the headstock attaching section, the headstock including a spindle;
    a slide section attached to the slide attaching section; and
    a tool rest provided laterally to the headstock and attached to the slide section, the tool rest including a turret
    wherein the attaching surface of the headstock attaching section is provided at an angle greater than 0 and less than 90 degrees with respect to a direction connecting a rotation center line of the spindle and a rotation center line of the turret.

2. A lathe according to claim 1,
    wherein the rotation center line of the spindle and the rotation center line of the turret are parallel to each other.

3. A lathe according to claim 2,
    wherein the rotation center line of the spindle and the rotation center line of the turret are arranged at the same height with respect to a horizontal direction.

4. A lathe according to claim 1, wherein
    the headstock attaching section includes an inner surface that faces the tool rest and an outer surface opposite to the inner surface,
    the attaching surface extends between the inner surface and the outer surface, and
    the attaching surface is slanted relative to a horizontal direction by a first angle.

5. A lathe according to claim 4, wherein the inner surface and the outer surface are each inclined relative to a vertical direction by a second angle.

6. A lathe according to claim 5, wherein the first angle and the second angle are each 15°.

7. A lathe according to claim 2,
wherein the headstock attaching section includes a first flange on a first side of the spindle and a second flange on a second side of the spindle, the second side being closer to the tool rest than the first side, and
wherein the headstock attaching section is slanted to the tool rest side so that the first flange is higher in a height direction than the second flange.

8. A lathe according to claim 4, wherein a slant direction length of the outer surface is longer than a slant direction length of the inner surface.

9. A lathe according to claim 1, wherein the bed includes a reduced thickness section on which the slide attaching section is lowered relative to the headstock attaching section.

* * * * *